May 13, 1958 J. W. STUDEBAKER ET AL 2,834,124
EDUCATIONAL WORKBOOK
Filed Dec. 10, 1956 2 Sheets-Sheet 1
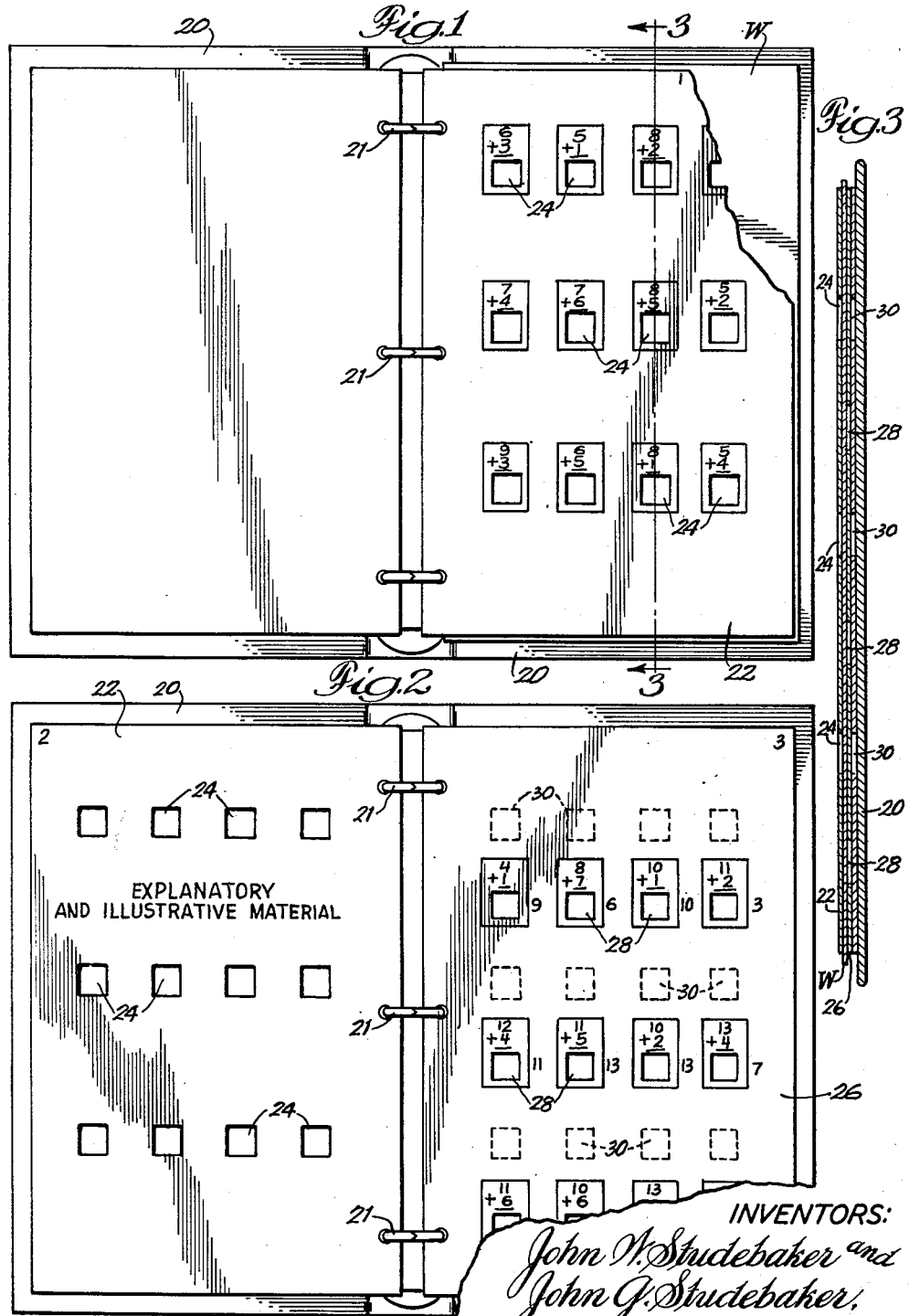
INVENTORS:
John W. Studebaker and
John G. Studebaker,
BY Bair, Freeman & Molinare
ATTORNEYS.

United States Patent Office 2,834,124
Patented May 13, 1958

2,834,124

EDUCATIONAL WORKBOOK

John W. Studebaker and John G. Studebaker, Bronxville, N. Y.

Application December 10, 1956, Serial No. 627,285

4 Claims. (Cl. 35—9)

This invention relates to an educational workbook having a plurality of pairs of apertured leaves. Adjacent the apertures in each of the leaves is printed a question, as for example, a mathematical problem. The responses to said questions are written by the learner through the aperture onto a worksheet inserted beneath the apertured leaf. Correct answers appear on the second of said pair of apertured leaves adjacent the appropriate aperture to facilitate checking the responses written on the worksheet by the learner. The answers may be easily checked by inserting the worksheet with the written responses thereon beneath the second leaf, with the responses aligned with the apertures therein. The correct answers may be printed so as to be visible through the apertures in the first leaf for study purposes.

The primary object of our invention is to provide a workbook of this kind in which the apertures in one leaf are so located with respect to the apertures in the second leaf of said pair that a smooth supporting writing surface is provided for worksheets inserted between said leaves.

In a preferred form of the invention the apertures in the first and second leaves of any pair are arranged in the same spaced relation with respect to each other, but are staggered with respect to their location on the leaf. Thus, responses which are written through the apertures in the first leaf will align accurately with the apertures in the second leaf when the sheet on which they are written is placed therebeneath. The apertures in the second leaf, however, do not align with the apertures in the first leaf but are shifted as a unit to coincide with a non-apertured portion of the first leaf so that a smooth writing surface is provided to support the worksheet inserted therebetween.

These and other objects and advantages of the invention will become apparent from the following description when read in conjunction with the accompanying drawings, in which:

Figure 1 is a plan view of a workbook constructed in accordance with the invention;

Figure 2 is a similar view wherein leaf 22 has been turned;

Figure 3 is a sectional view taken along the line 3—3 of Figure 1; and

Figure 4:
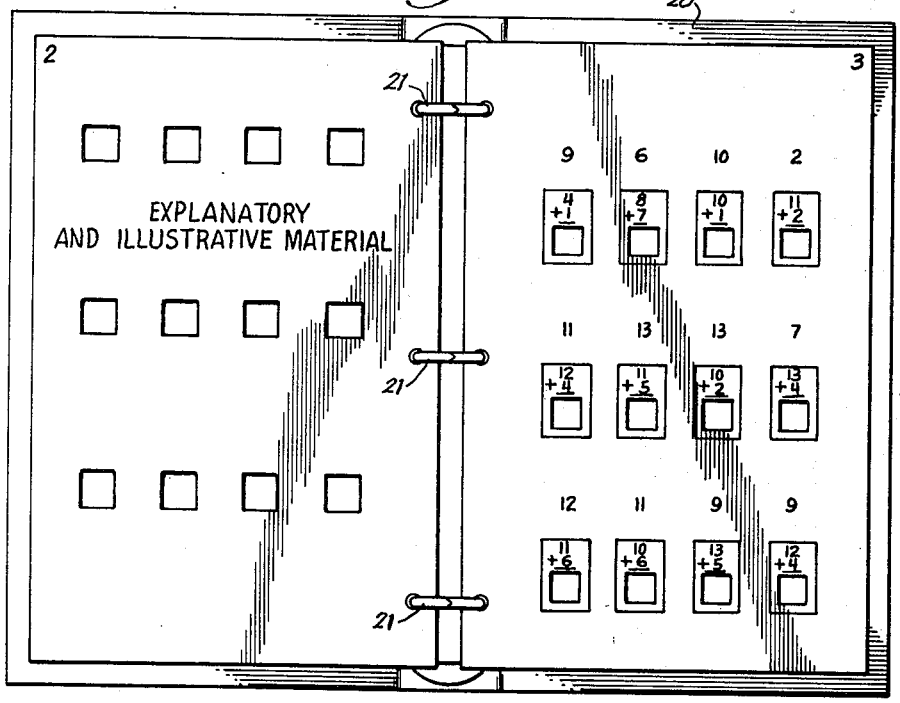
Figure 4 is a view similar to Figure 2 wherein the answers are located in a different position.

Referring now to Figure 1, the leaf 22 containing apertures 24 is secured at its marginal edge to the loose leaf notebook 20 by means of rings 21. Although the loose leaf form of book has been illustrated in the drawing, it will be understood that the leaves may be bound in any suitable manner, for example, the leaves may be stitched together or stitched and glued to form a more permanent book. The apertures 24 are arranged in horizontal and vertical rows—four across and three down. The arrangement is not critical, however, the distance between the apertures being governed primarily by the amount of space required for the problem. As illustrated, each aperture is associated with a mathematical problem printed adjacent the upper margin thereof.

Leaf 22, which is the first of a cooperating pair, is underlaid by leaf 26, which is the second of the pair. It contains a series of rows of apertures 28. It is essential that the apertures 28 be spaced with respect to each other exactly as apertures 24 in leaf 22 for reasons that will become apparent hereinafter. Also, the apertures 28 should be approximately the same size as apertures 24. Leaf 26 carries answers adjacent the right-hand margin of each of the apertures 28. These answers are the correct numerical responses to the arithmetic problems, or other incomplete subject matter, printed adjacent each aperture 24 in leaf 22. It will be noted that the rows of apertures 28 are located between the rows of apertures 24 so that regardless of whether leaf 22 or leaf 26 supports the worksheet on which the responses are written, a smooth supporting surface is presented. Page 3 of leaf 26 carries problems, the answers to which may be written on a worksheet inserted therebeneath through apertures 28. Another leaf beneath leaf 26 may contain apertures which are staggered with respect to the apertures 28 and are congruent with the apertures 24. The leaf underlying leaf 26 is not illustrated in the drawing since it is identical in construction to leaf 22, but the locations of the apertures are shown in broken lines and are designated by the numeral 30.

In using the workbook of the invention the learner places a worksheet W (Figure 1) beneath the leaf 22. He makes the calculations necessary to determine the correct answer to the problem printed adjacent each aperture 24 and then writes his responses through the apertures 24 on the sheet W therebeneath. The sheet W rests on and is supported by the non-apertured portions of the underlying leaf 26.

To check the accuracy of his responses the learner removes the worksheet W and places it beneath leaf 26. Since the apertures 24 are in the same spaced relation one to the other as the apertures 28, the written responses of the learner will appear through apertures 28 when the worksheet W is properly aligned. In the form shown, worksheet W will have to be shifted downwardly from its position beneath leaf 22 to bring about accurate alignment of the responses with apertures 28. The correct answers are readily visible simultaneously with the written responses and checking may be accomplished very quickly.

Leaf 26 may also carry problems in addition to the correct answers to problems on leaf 22. To prevent confusion it may be desirable to print the problems carried by leaf 26 in a color of ink different from the answers.

The correct responses to the problems appearing on page 3 of leaf 26 will appear on a leaf underlying leaf 26 which is not shown in the drawing, but as previously indicated, is similar in construction to leaf 22. The reverse side of leaf 22, designated in Figure 2 as page 2, may be reserved for explanatory and illustrative material. If desired, however, it may also carry problems and cooperate with the reverse side of an adjacent sheet (not shown) forward in the book.

In Figure 4 we have shown another form of the invention wherein the correct answers, or completing subject matter, may be printed on the second leaf of the pair (page 3) so as to be visible through apertures 24 in leaf 22. It will be noted that the answers "9," "6," "10" and "3" in the first row on page 3 are printed near the top margin of the apertures 28 directly beneath the apertures 24 in leaf 22. Thus, the correct answers are visible to the learner simultaneously with the problems so that they may be studied together. The worksheet W obscures the answer when the learner is testing himself. The method of checking the learner's responses is exactly as described above. The printed answers are preferably circled or printed in a different color to distinguish them from the problems appearing adjacent the same aperture.

Although only a single pair of apertured leaves is illustrated and described herein, it will be understood that additional pairs of leaves may be included in the book. The additional leaves may be of the construction described or they may be of other constructions, such as those shown in our copending applications Serial No. 617,969, filed October 24, 1956 and Serial No. 439,742, filed June 28, 1954, now Patent No. 2,789,370.

When used herein, the terms "questions" and "answers" will be understood to embrace any incomplete subject matter and completing subject matter, respectively.

What we claim as new and desire to secure by Letters Patent of the United States is:

1. An educational workbook for use with insertable worksheets on which answers may be written by a learner comprising a plurality of pairs of apertured leaves, the apertures in each leaf of the pair being in the same spaced relation with respect to each other but the apertures in the first leaf being staggered with respect to said apertures in said second leaf so that the non-apertured portions of each leaf provide a smooth supporting writing surface for an inserted worksheet resting thereon, said first leaf carrying questions associated with its apertures through which answers may be written on said inserted worksheet, correct answers for the questions on said first leaf appearing adjacent the apertures in the second leaf.

2. The book of claim 1 wherein both leaves of the pair carry questions associated with the apertures therethrough.

3. The book of claim 2 wherein the questions appearing on said second leaf are printed in a color different from the answers carried by said second leaf.

4. The book of claim 1 wherein said correct answers are visible through the apertures of said first leaf.

No references cited.